J. WINTERBURN.
Ore Roasting Furnace.
No. 9,454.
Reissued Nov. 9, 1880.
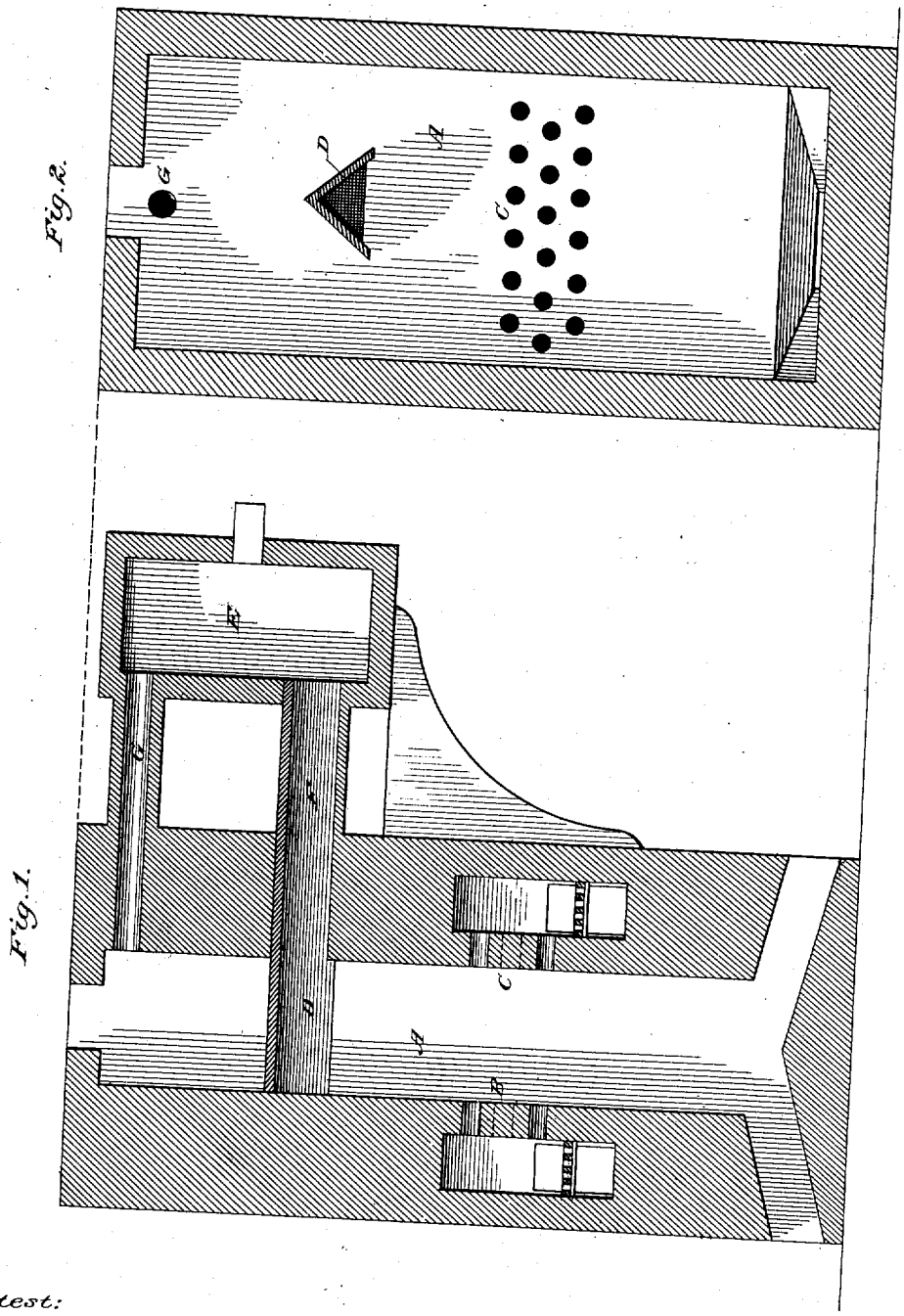
Attest:
R. F. Barnes.
D. W. Lacy
Inventor:
John Winterburn
by Elec Spear
Attorney.
N. PETERS, PHOTO-LITHOGRAPHER, WASHINGTON, D. C.

UNITED STATES PATENT OFFICE.

JOHN WINTERBURN, OF CAMBRIA, CALIFORNIA.

ORE-ROASTING FURNACE.

SPECIFICATION forming part of Reissued Letters Patent No. 9,454, dated November 9, 1880.

Original No. 181,886, dated September 5, 1876. Application for reissue filed July 29, 1880.

*To all whom it may concern:*

Be it known that I, JOHN WINTERBURN, of Cambria, San Luis Obispo county, State of California, have invented an Improved Ore-Roasting Furnace; and I do hereby declare the following description and accompanying drawings are sufficient to enable any person skilled in the art or science to which it most nearly appertains to make and use my said invention without further invention or experiment.

My invention relates to certain improvements in furnaces for roasting ores which contain volatile substances of value, such as the ores of mercury.

My invention consists in the introduction above the fire-arches of a prism-shaped deflector, which serves as a combined distributer for the ore and discharge-pipe for the vapors, which it leads into the condensers.

My invention consists in the use of a steam pipe or passage which opens into the upper part of the furnace, leading thence into the condenser, and this pipe conducts away the steam arising from the drying of wet ore, so that no especial drying apparatus need be used previous to its introduction into the furnace.

Referring to the accompanying drawings for a more complete explanation of my invention, Figure 1 is a longitudinal vertical section of my furnace. Fig. 2 is a transverse vertical section.

A is the body of my furnace, which may be built in any suitable form up to the fire-places. B C are the arches, through which the heat reaches the ore in the interior of the furnace.

At a point about four feet above the arches is placed a distributer, D. This distributer is prism-shaped, having one of its angles uppermost, so as to present two diverging sides to the body of ore as it moves downward, and it may be made of iron, brick, fire-tiles, or any material which is most suitable, and it extends entirely across the body of the furnace. It has its lower side entirely open where it crosses the furnace and connects with the exit-pipe F, so as to allow the vapors which arise from the roasted ore to pass into it readily and be drawn into the condenser E through the said pipe F, which forms a continuation of the prism-shaped distributer. The diagonal upper sides of the distributer D act as deflectors, and the fine ore and earthy matter will be thrown to the sides, while the larger ore will, after passing the distributer, tend to the center.

By this construction I am enabled to reduce in an ordinary furnace from one-fourth to one-half of its full capacity of fine ore and earthy matter without other treatment. As the exit-passage is directly beneath the distributer, it can never become choked, and all the fumes which arise from the ore beneath that level will be easily collected by the single pipe F. The steam pipe or passage G is placed about six or seven feet above the distributer D and leads into a condenser, as shown. It enables me to utilize all the heat which passes through the ore above the exit-pipe to dry the ore before it passes the distributer D, where the reduction practically begins. Much of the ore comes to the furnaces in a wet condition, and it is absolutely necessary to dry it before it can be satisfactorily reduced in ordinary furnaces, making considerable extra expense for fires and the handling of the ore.

In my device the ore is fed into the furnace from time to time as it is needed without any previous drying or separation, and the heat of the fire, as it escapes above the exit and distributing flue D, serves to thoroughly dry it before it passes down to the point where reduction begins. Practical use proves that with this device wet ore can be reduced with the same facility and speed that can be accomplished with dry ore in ordinary furnaces, and with dry ore the capacity is nearly doubled.

The device is also of great assistance to the condensers, because, instead of allowing all the heat to rush into the condenser, as in ordinary furnaces, a large part of it passes above the exit-pipe and becomes latent in converting the water of the ore into steam. This steam may either pass directly to the main condenser or it may be led into separate condensers, so that the steam and vapors may be condensed separately from the mercurial fumes.

My device acts as a separator, because the steam and other fumes or vapors are carried off above the distributer D at a heat of less than 400°, while the mercury is volatilized at a higher heat below this distributer, and is carried to the condensers by itself. By mingling the cooler vapors that escape from the ore-chamber through the upper pipe, G, with the hottest vapors passing out of the ore-chamber through the lower outlet a material assistance is rendered toward reducing the heat of the latter vapors at a point where the high degree of heat is of no further use, but the cooling or condensing process is of advantage; whereas heretofore the cooler vapors, instead of having an outlet from the ore-chamber through an upper pipe, have been necessarily mingled with the quicksilver vapors in the body of the furnace and heated with them to a temperature which would resist condensation. This steam-pipe, by carrying the vapors which collect in the upper part of the ore-chamber, and which usually contain more or less mercurial vapors, prevents the escape of such vapors into the open air when the furnace is opened at the top for putting in ore, and thereby prevents a loss of mercurial vapors, and at the same time prevents sickness among the workmen employed in putting in the ore, consequent upon breathing such escaping vapors.

It saves about one-fourth of the fuel and makes less soot, also a better product of mercury, than other forms of furnace. The mercury is easier to condense than when in the presence of steam, which tends to float and carry off some portion of the mercurial vapor.

Having thus described my invention, what I claim as new, and desire to secure by Letters Patent, is—

1. The prism-shaped distributer extending across the furnace in a line with and connecting with the pipe F, so as to act both as a distributer and fume-conveyer, as described.

2. The furnace A, having the fume-collecting distributer D so placed as to receive the fumes arising from the reduction of the ore below that point, and the pipe or passage G, situated above said collector for the purpose of separating and conveying away the steam and vapors caused by drying the ore in its passage to the distributer, substantially as herein described.

3. In quicksilver and similar furnaces, a steam pipe or passage, G, constructed and applied for conducting steam and vapors from the upper part of the ore-chamber at a lower temperature than the vapors which are carried out of the ore-chamber at the main or lower outlet, in combination with said lower outlet, with the main chamber, and with the deflector, all substantially as herein described.

In witness whereof I have hereunto set my hand.

JOHN WINTERBURN.

Witnesses:
S. H. NOURSE,
FRANK A. BROOKS.